March 17, 1942.   D. B. LIVINGSTON   2,276,276
CLUTCH
Filed Jan. 27, 1941

Inventor
Donald B. Livingston
By Spear, Rawlings & Spear
Attorneys.

Patented Mar. 17, 1942

2,276,276

UNITED STATES PATENT OFFICE 2,276,276

CLUTCH

Donald B. Livingston, Beverly, Mass., assignor to Kinney Manufacturing Company, Jamaica Plain, Mass., a corporation of Massachusetts Application January 27, 1941, Serial No. 376,050

11 Claims. (Cl. 192—69)

My present invention relates to an improved clutch structure having compactness, increased efficiency and durability for its general characteristics.

The type of clutch with which my present invention is primarily concerned is of the type in which one of the members to be coupled carries a backing plate and a slidable clamping plate between which are located conventional clutch discs carried by each of the two members. The clutch is engaged by means of a slide on the other member actuating the clutch operating mechanism. In such clutches, considerable difficulty has been experienced in effecting a smooth, positive pick-up of the load under all operating conditions with a minimum of wear in making such structures compact.

In accordance with my invention, the clutch operating mechanism consists of thrust arms pivotally mounted on the clamping or thrust plate to be forced by the operator controlled slide against a race adjustably attached to the clutch member which slidably carries the thrust plate. I resiliently dominate the thrust arms in order to offset the influence of centrifugal force on them and positively limit their movement when the slide is moved into clutch releasing position. By this construction I am able to provide short travel of the thrust arms to engage or release the clutch, making a compact clutch possible and ensuring the proper pick-up or release of its load. At the same time my clutches are durable and easily adjusted and otherwise serviced.

In the drawing I have illustrated an embodiment of my invention from which and the accompanying specification its novel features and advantages will be readily apparent. In the drawing.

Figure 1:
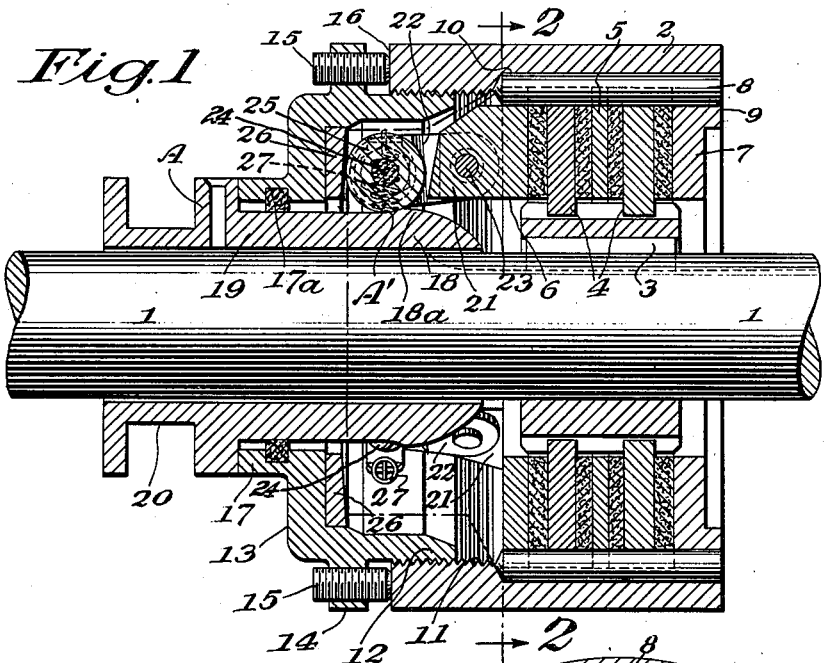
Fig. 1 is a partly sectioned view of a clutch assembly in accordance with my invention showing the clutch engaged.
Figure 2:
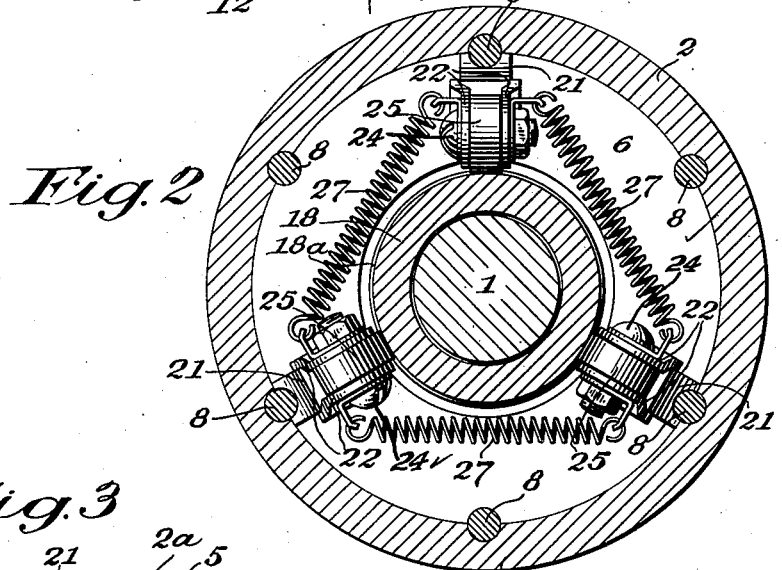
Fig. 2 is a section along the lines 2—2, of Fig. 1.

I have indicated at 1 and 2 the members to be coupled and while either of these may be the drive member, it may be assumed for purposes of description that the member 2 is the drive member. The member 2 is shown as a cylindrical casing and the member 1 as a shaft axially entrant thereof.

Splined to the shaft 1 is a pinion gear 3 slidably supporting clutch plates or discs 4 to engage with the clutch disc 5 when the clamping or thrust plate 6 is thrust towards the backing plate 7 formed in the illustrated embodiment of my invention as the back thrust part of the casing 2. Splines 8 inserted into apertures 9 through the backing plate 7 and the grooves 10 in the casing 2 slidably hold the clutch disc 5 and the clamping plate 6 against rotation relative thereto.

I form the interior of the casing 2 with threads as at 11 to receive the threaded flange 12 of the head 13. The head 13 is formed with an annular flange 14 carrying set screws 15 to bear against the adjacent end 16 of the casing 2 to lock the head 13 securely thereto in any position selected to give desired clutch engagement.

The head 13 is formed with a hub 17 having an aperture sufficiently larger than the shaft 1 to receive the wedge end 18 of the slide 19 freely supported by the shaft 1. To completely enclose the clutch parts, I seal the space between the head 13 and the slide by a ring 17a of any suitable material. The slide 19 is adapted to bear against the hub 17 to limit the inward movement of the wedge 18 and is grooved as at 20 to receive an operated actuated fork or the like (not shown) by which the clutch is engaged or disengaged.

I provide the clamping plate 6 with a plurality of lugs or ears 21 through which pairs of links 22 are interconnected by pivots 23. At their free ends, the links 22 carry detachable interconnecting axles 24 supporting rollers 25. The thrust arms established by the pivoted links 22 and the rollers 25 have a normal position when the clutch is disengaged in contact with the front edge of the ears 21 (see Fig. 3) and are of sufficient length to thrust the clutch parts into engaged position when spread by the wedge 18 into contact with the race 26 carried by the interior face of the head 13 (see Fig. 1). The race 26 preferably is formed to present a slightly inclined surface for engagement by the rollers 25 in order to avoid the possibility of the thrust arms or any one of them locking in clutch engaging position and also to minimize the arcuate travel of the thrust arms necessary to effect clutch engagement in order to permit the clutch to be compact. The angularity of the race 26 is, however, as slight as possible, for example 6°, in order not to offer material resistance to clutch engagement. The high point of the wedge 18 is indicated at 18a and rearwardly thereof it decreases slightly in size to ensure the maintenance of the clutch in engaged position until the slide 19 is positively shifted by the operator into clutch releasing position. The decrease in size is exaggerated in the drawing.

Where the casing 2 is the driving member, the thrust arms are subject at all times to centrifugal force tending to move them into clutch engaging position. If the shaft 1 is employed as the drive member, the influence of centrifugal force is effective only when it is desired to uncouple the members 1 and 2, as under these conditions, centrifugal force would tend to maintain clutch engagement. Accordingly, I interconnect adjacent links 20 by springs 25 of sufficient resilience to offset the maximum centrifugal force to which the thrust arms are to be subjected.

Wear on the rollers 25 is reduced to a minimum because the clamping plate 6 and the head 13 rotate together. Wear resulting from contact with the wedge 18 is slight because the slide 19 is free on the shaft 1 and for that reason the slide 19 and the wedge 18 are rotated with the head 13 and the casing 2 by the frictional contact of the rollers 25 therewith. The rollers 25, of course, rotate as the wedge 18 is moved into or out of clutch actuating position and they may be easily replaced if necessary.

Clutch adjustment of the embodiment of my invention shown in Fig. 1 is effected by releasing the set screws 15 and turning the head 13 relative to the casing 2 as required. The screws 15 are then set up.

Figure 3:
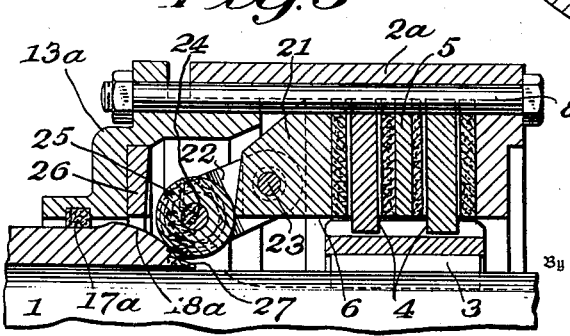
Fig. 3 is a view generally similar to Fig. 1, of a modification of my invention and showing the clutch released.

In Fig. 3 I have shown a modification of my clutch in which the head 13$^a$ fits freely within the casing 2$^a$ and both are grooved to receive the splines 8$^a$ constituting bolts attaching the head 13$^a$ to the casing 2$^a$. This structure has the advantage of positively locking the head and casing and permits accurate and easy adjustment of the clutch when engaged since adjustment, in this embodiment of my invention, does not require rotation of the head relative to the casing.

It will be apparent that clutches in accordance with my invention are compact and combine simplicity and durability of construction with efficiency in operation.

What I therefore claim and desire to secure by Letters Patent is:

1. A clutch comprising a pair of members to be coupled, one of said members including an annular casing and the other of said members being concentric therewith and extending within said casing, a backing member carried by said casing, a clamping plate slidably carried by said casing, clutch discs carried by said casing and said other member between said backing member and said clamping plate, a head plate carried by said casing, said head plate having an aperture substantially larger than said other member, a race having a thrust portion carried by one of said plates, thrust arms pivotally carried by the other of said plates, said thrust arms having a normal position remote from said thrust portion of said race but being of sufficient length to effect clutch engagement when in contact therewith, a slide carried by one of said members to be coupled, said slide having a wedge portion entering said casing through said head plate aperture to carry the free ends of said thrust arms from their normal position into a position wherein they contact said thrust portion of said race, and resilient means in control of said arms negativing the influence of centrifugal force thereon.

2. The clutch of claim 1, and means limiting the movement of said thrust arms by said resilient means.

3. The clutch of claim 1, in which the head plate is threaded into said casing and includes an annular flange and set screws threaded through said flange for locking contact with said casing.

4. The clutch of claim 1, in which the head plate includes a portion entrant of said casing, said portion and said casing having longitudinal grooves, a bolt in each of said grooves interlocking said head plate and said casing against relative rotation and constituting a spline for said clamping plate and said clutch discs carried by said casing, and an adjusting nut on each bolt whereby said clutch can be adjusted when engaged.

5. A clutch comprising a pair of members to be coupled, one of said members including an annular casing and the other of said members being concentric therewith and extending within said casing, a backing plate carried by said casing, a clamping plate slidably carried by said casing, clutch discs carried by said casing and said other member between said plates, a head carried by said casing, said head having an aperture substantially larger than said other member, ears carried by said clamping plate, pairs of thrust arms pivotally mounted on each of said ears, a roller pivotally carried by each pair of thrust arms, each of said rollers having a normal position when said clutch is disengaged in contact with one of said ears, a race carried by said head to intersect the arc of travel of said rollers, a slide on said other member having a wedge portion entering said casing through said head aperture to carry the free ends of said thrust arms against said race, and resilient means in control of said arms negativing the influence of centrifugal force thereon.

6. A clutch comprising a pair of members to be coupled, one of said members including an annular casing and the other of said members being concentric therewith and extending within said casing, a backing plate carried by said casing, a clamping plate slidably carried by said casing, clutch discs carried by said casing and said other member between said plates, a head carried by said casing, said head having an aperture substantially larger than said other member and a race spaced from said clamping plate, ears carried by said clamping plate, thrust members pivotally mounted on said ears, means carried by said thrust members having a normal position when said clutch is disengaged in contact with said ears, said thrust members being of sufficient length to effect clutch engagement when in contact with said race, a slide on said other member having a wedge portion entering said casing through said head aperture to carry the free ends of said thrust members against said race, and resilient means in control of said thrust members negativing the influence of centrifugal force thereon.

7. Thrust mechanism to coact with a race in a clutch, said thrust mechanism comprising a clutch plate, a plurality of spaced ears on said plate, means pivotally interconnected through each of said ears, a roller supported by said means and springs interconnecting the means to offset the influence of centrifugal force on said thrust mechanism.

8. Thrust mechanism to coact with a race in a clutch, said thrust mechanism comprising a clutch plate, a plurality of spaced ears on said plate, a pair of arms pivotally interconnected through each of said ears, a roller mounted between the free ends of each pair of arms, and springs interconnecting the adjacent arms of adjacent pairs to offset the influence of centrifugal force on said thrust mechanism, and said ears being shaped to support said rollers to limit the movement of said arms by said springs.

9. A clutch comprising drive and driven members to be coupled, one of said members including an annular casing and the other of said members being concentric therewith and extending within said casing, coactive clutch elements carried by said casing and said other member, means to engage said clutch, said means comprising a pair of members, one of said members being carried by said casing and having an aperture substantially larger than said other member and the other of said members being slidably carried by said casing, a slide having a wedge portion entrant of said casing through said aperture, thrust arms, means pivotally connecting said thrust arms to one of said pair of members, said connecting means and the other of said pair of members being so formed and disposed that as said thrust arms are carried outwardly by said wedge portion said thrust arms coact with the other of said pair of members to effect clutch engagement, and means to negative the influence of centrifugal force on said thrust arms.

10. A clutch comprising drive and driven members to be coupled, one of said members including an annular casing and the other of said members being concentric therewith and extending within said casing, said casing including a backing member, clutch discs carried by said casing and the other of said members, clamping means slidably carried by said casing, a head carried by said casing, said head having a race and an aperture substantially larger than said other member, a slide having a wedge portion entrant of said head aperture, means operable by said slide to coact with said race to actuate said clamping means to engage said clutch, said operating means comprising thrust arms, means pivotally connecting said thrust arms to said clamping means so that as said thrust arms are moved outwardly by said wedge portion said thrust arms coact with said race, and means in control of said arms negativing the influence of centrifugal force thereon.

11. The clutch of claim 10, in which the clamping means comprises a clutch plate.

DONALD B. LIVINGSTON.